United States Patent [19]

Johnston

[11] 4,176,557
[45] Dec. 4, 1979

[54] PRESSURE SENSOR

[75] Inventor: Samuel A. Johnston, Fontana, Wis.

[73] Assignee: Bunker Ramo Corporation, Oak Brook, Ill.

[21] Appl. No.: 899,236

[22] Filed: Apr. 24, 1978

Related U.S. Application Data

[63] Continuation of Ser. No. 693,436, Jun. 7, 1976, abandoned.

[51] Int. Cl.² ............................................. G01L 7/10
[52] U.S. Cl. ........................................ 73/708; 73/756
[58] Field of Search ................. 73/431, 756, 729, 708, 73/718, 724, 706

[56] References Cited

U.S. PATENT DOCUMENTS

| | | | |
|---|---|---|---|
| 2,714,703 | 8/1955 | Ruderfer | 73/724 |
| 2,773,388 | 12/1956 | Prosser | 73/431 |
| 3,129,589 | 4/1964 | Tatum et al. | 73/753 |
| 3,247,719 | 4/1966 | Chelner | 73/756 |
| 3,271,720 | 9/1966 | Hluchan et al. | 73/729 |
| 3,318,138 | 5/1967 | Rolfson | 73/431 |
| 3,405,559 | 10/1968 | Moffatt | 73/724 |
| 3,479,879 | 11/1969 | Music | 73/718 |
| 3,602,047 | 8/1971 | Kistler | 73/718 |
| 3,808,480 | 4/1974 | Johnston | 73/718 |

FOREIGN PATENT DOCUMENTS

| | | | |
|---|---|---|---|
| 2021479 | 2/1970 | Fed. Rep. of Germany | 73/718 |
| 7035319 | 4/1972 | France | 73/729 |

*Primary Examiner*—Anthony V. Ciarlante
*Attorney, Agent, or Firm*—William Lohff; F. M. Arbuckle

[57] ABSTRACT

A pressure sensor includes a pressure transducer which has an electrical element therein in the form of a pressure-affected capacitance which is electrically connected to an electronic circuit which is operable to provide an electrical signal representing fluid pressure applied to the transducer. The transducer and the electronic circuit are packaged in a housing and are isolated from each other within the housing by a seal constructed of a material having a very low temperature coefficient of dielectric constant. The housing includes a metal can having a closed end with an aperture therein for connection to a fluid system to be monitored. The electrical leads extending between the pressure sensitive variable capacitance and the electronic circuit extend through the dielectric seal spaced from each other and spaced from the metal can so as to be shielded and prevent stray capacitance from the affecting operation. In one embodiment the metal can is provided with a metal stem having a fluid passageway therein in communication with the aperture and the stem is adapted for mounting to a support. In another embodiment, the metal can is covered with an insulating jacket to provide thermal insulation and minimize heat transfer between the sensor and the environment thereof. The jacket is provided with the stem, which in this embodiment is made of material which is a poor conductor of heat, and the stem incorporates the passageway in communication with the aperture in the can. Each of the chambers defined on opposite sides of the seal in the can is provided with a heater. A thermostatic heater control circuit is mounted on a base which seals the open end of the can and which carries electrical terminals for connection to an electrical supply and to electrical circuits which utilize the electrical output signal of the sensor.

55 Claims, 11 Drawing Figures

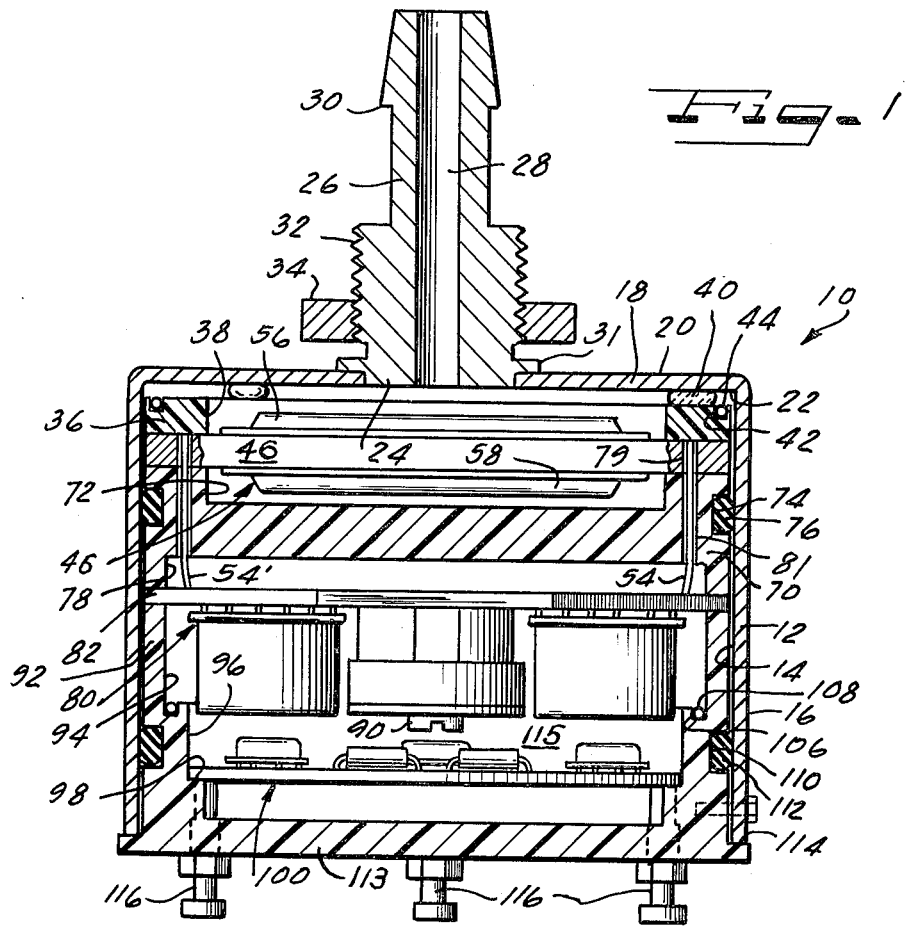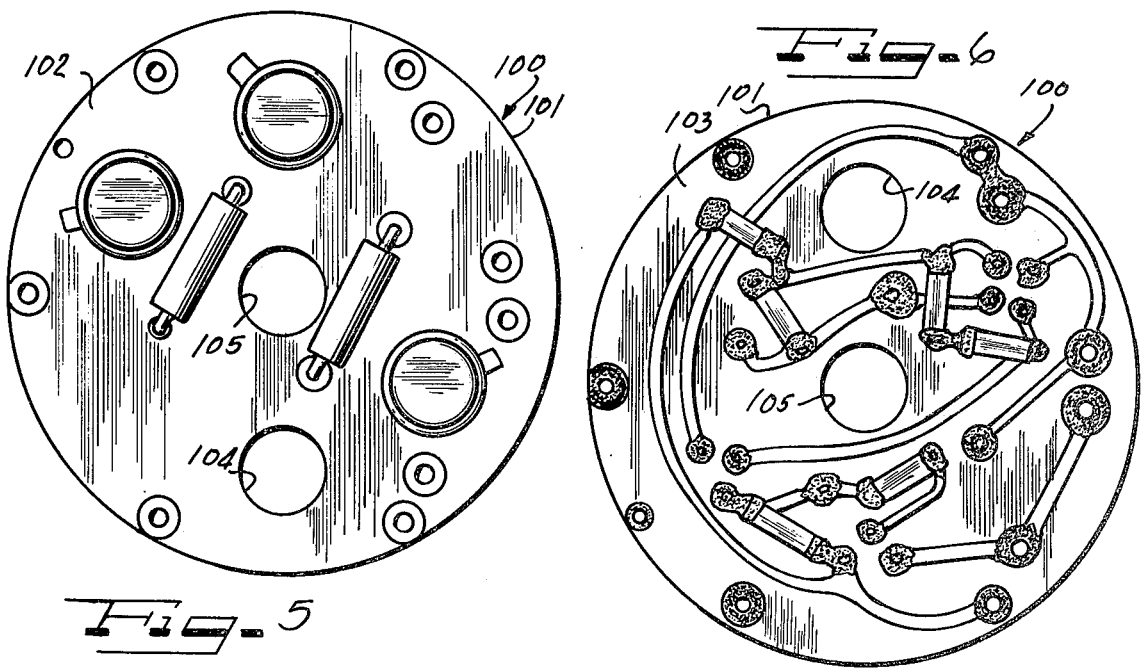

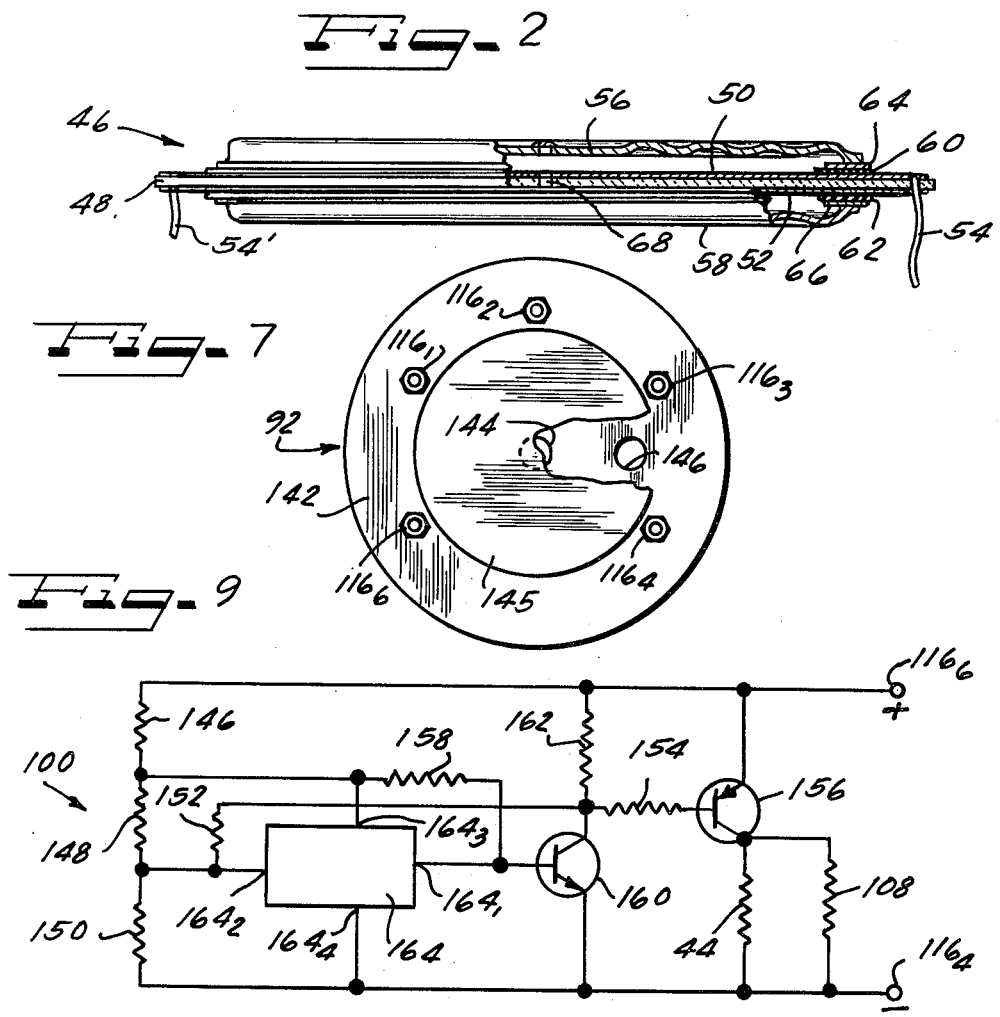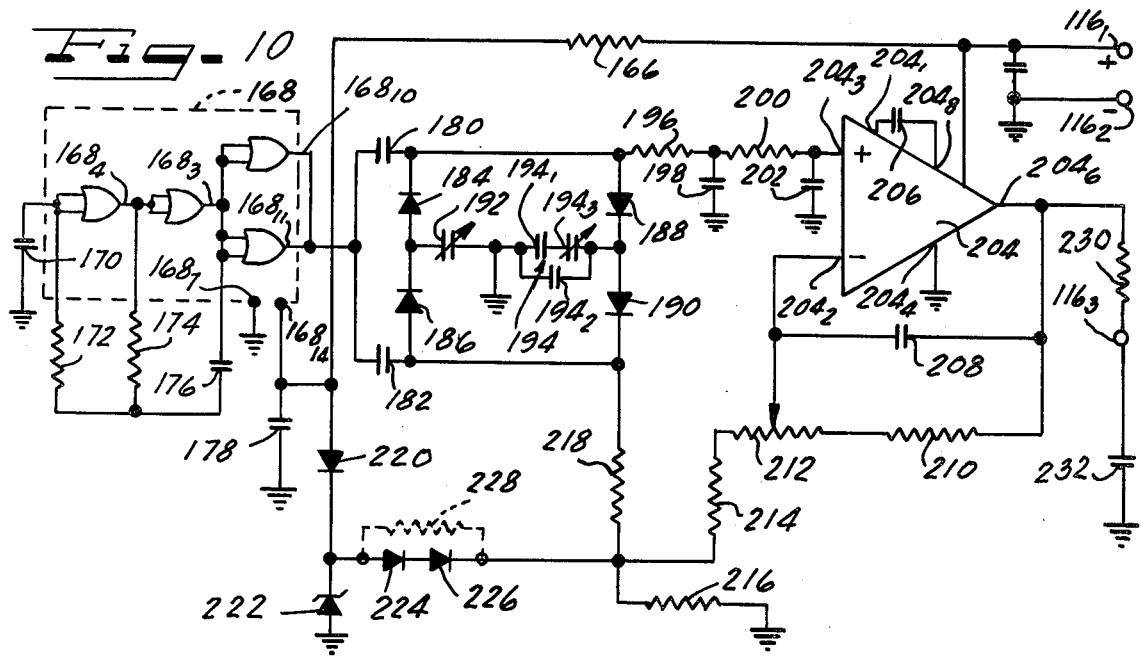

4,176,557

PRESSURE SENSOR

This is a continuation, of application Ser. No. 693,436, filed June 7, 1976 now abandoned.

BACKGROUND OF THE INVENTION

1. Field of the Invention

This invention relates to pressure sensors, and more particularly to the packaging of pressure sensors so as to eliminate or minimize deleterious ambient and environmental effects.

2. Description of the Prior Art

Small aneroid pressure sensors of the type having a capacitive pressure capsule are well known in the art. For example, one may refer to my U.S. Letters Pat. Nos. 3,808,480, granted Apr. 30, 1974, and 3,880,009, granted Apr. 29, 1975, both assigned to Bunker Ramo Corporation, for discussions of the basic structure and operation of capacitive type pressure capsules. In the latter of these patents, it is explained that variations in pressure can be employed to change the capacitance of an appropriate constructed sensing device in which one of the plates is constructed in the form of a diaphragm. With one side of the diaphragm exposed to a pressure to be sensed, variations in that pressure will be reflected as changes in the capacitance between the diaphragm and a fixed capacitor plate.

As also set forth in that patent, a change in capacitance may be utilized to change the operating frequency of an oscillating circuit or a variable frequency signal generated can be applied to a discriminator to obtain an analog output, or to a gated counter to obtain a digital output. Circuits for accomplishing these functions are disclosed in my aforementioned U.S. Pat. Nos. 3,808,480, and in 3,295,360 and 3,595,084.

The pressure capsule per se and the electronic circuits per se for utilizing a pressure capsule to provide various output signals are not a part of the present invention, but are fully incorporated herein by the above references for a more complete appreciation of the present invention and to simplify the detailed description of the invention.

Heretofore, as evidenced by the above-cited patents, the art has been directed to refining pressure sensors in respect of size and weight reduction, manufacturing economy, and the like. In my U.S. Pat. No. 3,808,480, I also provided for a shielding of an integrated circuit device against electromagnetic interference by placing the integrated circuit between the metallic diaphragms of the pressure capsule.

SUMMARY OF THE INVENTION

With the ever increasing number of applications of pressure transducers of the general type described above, a plurality of ambient and environmental effects are encountered, many of which may cause erroneous electrical response. For example, transducers may be mounted in an environment which is subjected to temperature extremes. Along with this, it is sometimes required that the pressure sensor be mounted directly on a support which functions as a heat source and/or heat sink. For convenience, the term "heat source" should also be taken to mean a heat sink. Caustic and corrosive materials may also be found in the monitored fluid supply, and it is highly desirable to isolate electronic circuits from the effects of such materials.

Therefore, it is the primary object of the invention to provide a pressure sensor which is not adversely affected by ambient and environmental conditions.

A more specific object of the invention is to provide a pressure sensor in which the electronic sensing circuits are isolated from the pressure chamber which contains the pressure capsule.

Another object of the invention is to provide a pressure sensor which may be mounted in an environment which is subject to temperature extremes, with the attendant object of providing a pressure sensor having a housing in which the temperature is maintained substantially constant.

According to the invention, a pressure sensor is constructed from a number of modular subassemblies, each of which is constructed in accordance with electronic hybrid manufacturing techniques.

Another object of the invention is to provide an assembly and testing process in which subassemblies may be individually tested, secured together as a complete electrical package, inserted and sealed within a housing with the aid of the application of a modest vacuum, and then tested and adjusted as a total package.

According to the invention, a pressure sensor comprises a hollow metal can having a closed end and an open end with an aperture in the closed end for receiving fluid pressure. A first insulator closes the open end of the metal can and a second insulator is disposed adjacent the closed end of the can which has the aperture therein. The first and second insulators each include a groove supporting a respective heater, and a heater circuit is mounted on a shoulder of the first insulator. A third insulator is disposed within the metal can in a sealing relation with the interior thereof to provide chambers on opposite sides thereof. A pressure transducer is mounted on the third insulator in one chamber in communication with the aperture and an electronic sensing circuit is mounted on the third insulator within the other chamber and electrically connected to the pressure transducer. The second and third insulators are constructed of a material having a low thermal coefficient of dielectric constant and the electrical connections between the pressure transducer and the electronic sensing circuit extend through the third insulator in order to minimize stray capacitance and maintain a constant capacitance between the pressure transducer and the electronic sensing circuit. The seal provided by the third insulator protects the electronic heater circuit from the deleterious effects of materials in the fluid being sensed.

The hollow metal can, preferably constructed of copper, is provided with a fluid inlet which is in communication with the aperture. The fluid inlet is in the form of a tube having a passageway therethrough, the tube being adapted, as by an outer thread, for mounting on a support. The tube may be constructed, for example, from a metal such as brass.

In another embodiment the tube is integral with and constructed of the same material as a plastic insulating jacket which covers the hollow metal can. The jacket may be provided with a plurality of internal recesses which, together with the external surface of the can, form dead air insulating spaces which provide additional thermal resistance.

BRIEF DESCRIPTION OF THE DRAWINGS

Other objects, features and advantages of the invention, its organization, construction and operation will be best understood from the following detailed description taken in conjunction with the accompanying drawings, on which:

FIG. 1 is an elevational view, shown in section, of a pressure sensor constructed in accordance with the principles of the present invention;

FIG. 2 is an elevational view, shown partially in section, of a pressure capsule which may be used in the pressure sensor of FIG. 1;

FIG. 5 is a plan view of one side of a circuitboard carrying some of the electrical components of the temperature controller circuit;

FIG. 6 is a plan view of the other side of the circuitboard of FIG. 5 shown carrying other electrical components of the temperature controller circuit;

FIG. 7 is an end view of the pressure sensor of FIG. 1 showing the electrical terminals, adjustment access holes, and a seal for the holes;

FIG. 9 is a schematic circuit diagram of a heater circuit which may be utilized in practicing the present invention;

FIG. 10 is a schematic diagram of an electronic sensing circuit which may be used in practicing the present invention.

DESCRIPTION OF THE PREFERRED EMBODIMENTS

Figure 8:
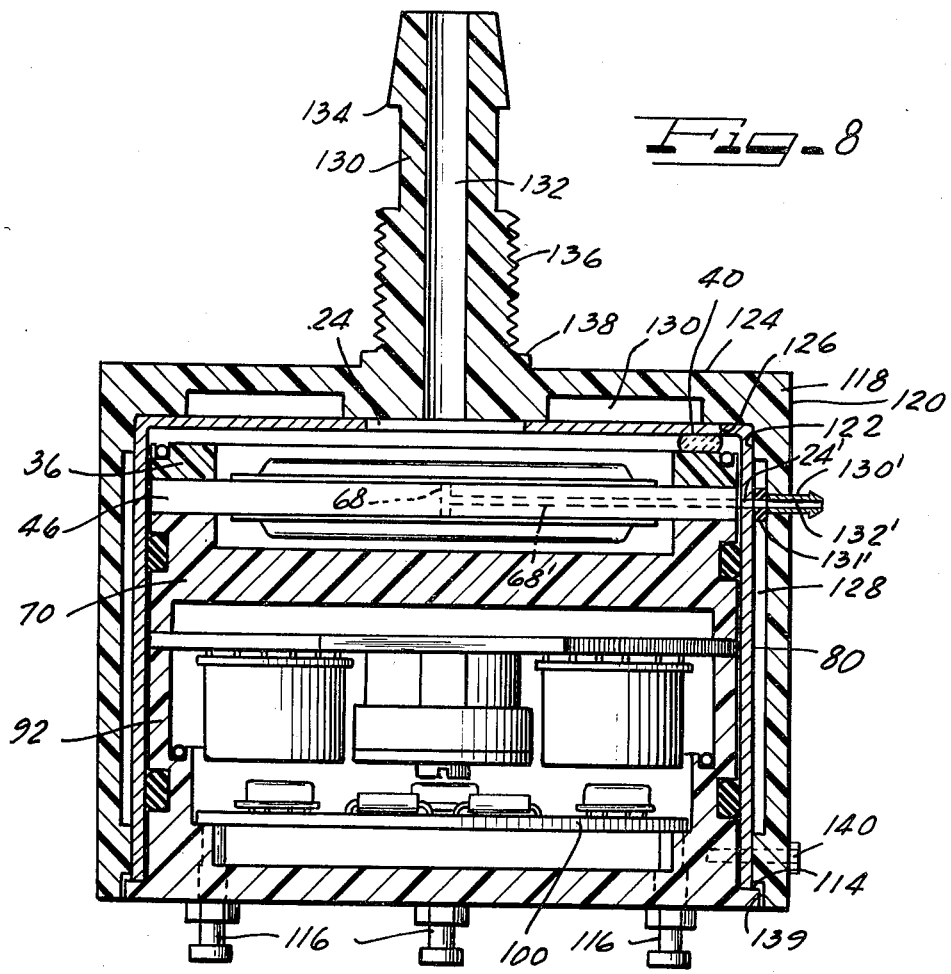
FIG. 8 is an elevational view, shown in section, of another pressure sensor constructed in accordance with the principles of the invention, specifically showing an outer insulating jacket.

Referring first to FIG. 1, a pressure sensor is illustrated at 10 as comprising a housing in the form of a hollow metal can having a cylindrical wall 12 with an inner surface 14 and an outer surface 16, and a closed annular end wall 18 having an outer surface 20, an inner surface 22 and an aperture 24. The can per se is open at its opposite end. A tubular stem 26 of a metal, for example brass, provides communication through the aperture 24 by way of a central fluid passageway 28. The stem 26 is adapted at 30 for connection to a rubber tubing or other fluid supply conduit. The stem 26 is secured in a gas-tight manner to the end wall 18, as by soldering, and includes a flange forming a shoulder 31 to bear against a support and fastening means, such as a thread 32 and a nut 34 for securing the sensor to the support.

Within the can is a plurality of elements, the innermost of which is a spacer ring 36 which, when inserted into the can, is pressed against a plurality, for example three, equally spaced dabs 40 of elastomeric material, for example RTV elastomeric material. The spacer ring includes a central aperture 38 and an annular groove 44 having a heating element 42 mounted therein. The heating element may be constructed as a coil of resistance wire.

For convenience in describing relationships of the various elements, the stem end of the pressure sensor will hereinafter be considered the upper end of the device.

A pressure capsule 46 bears against the lower surface of the spacer ring 36 and is generally illustrated in FIG. 2 as comprising a circuitboard 48 carrying a metal plate 50 on one side thereof and a metal plate 52 on the other side thereof as fixed capacitor plates. A metal diaphragm 56 is carried on the upper surface of the circuitboard 48 and a metal diaphragm 58 is carried on the lower surface of the circuitboard 48; they constitute movable capacitor plates. The metal diaphragms 56 and 58 are connected to respective electrodes 64 and 66 which, in turn, are connected to a common electrical lead 54'. The electrodes 64 and 66 are insulated from the plates 50 and 52 by respective insulators 60 and 62. The plates 50 and 52 are connected together with an electrical lead 54. The leads 54 and 54' are spaced from each other in order to minimize and stabilize stray capacitance therebetween.

Returning now to FIG. 1, a capsule cavity closure 70 formed of dielectric material bears against the lower surface of the pressure capsule 46 and includes a central recess 72 for receiving the lower metal diaphragm 58 while the upper metal diaphragm 56 is received in the aperture 38 of the spacer ring 36. The capsule cavity closure 70 includes a peripheral groove 74 having an O-ring 76 therein which provides a seal with the inner surface 14 of the metal can and thus divides the can into an upper chamber, (the pressure chamber), and a lower chamber which houses electrical components. The cavity closure isolates the electrical components from the deleterious effects of moisture, dirt or corrosive gases which may be in the fluid being monitored. For each electrical lead 54, 54', the capsule 46 and the capsule cavity closure 70 include aligned apertures 79, 81 for receiving the electrical leads therethrough. During assembly, these apertures are sealed with the leads therein, using any suitable compound. The material of the capsule cavity closure 70 and the spacer ring 36 is a low loss dielectric material which should be chosen to have a minimum change of dielectric constant for the range of environmental conditions in which the device is expected to operate, as, for example, exposure to temperature and humidity changes.

Figures 3, 4:
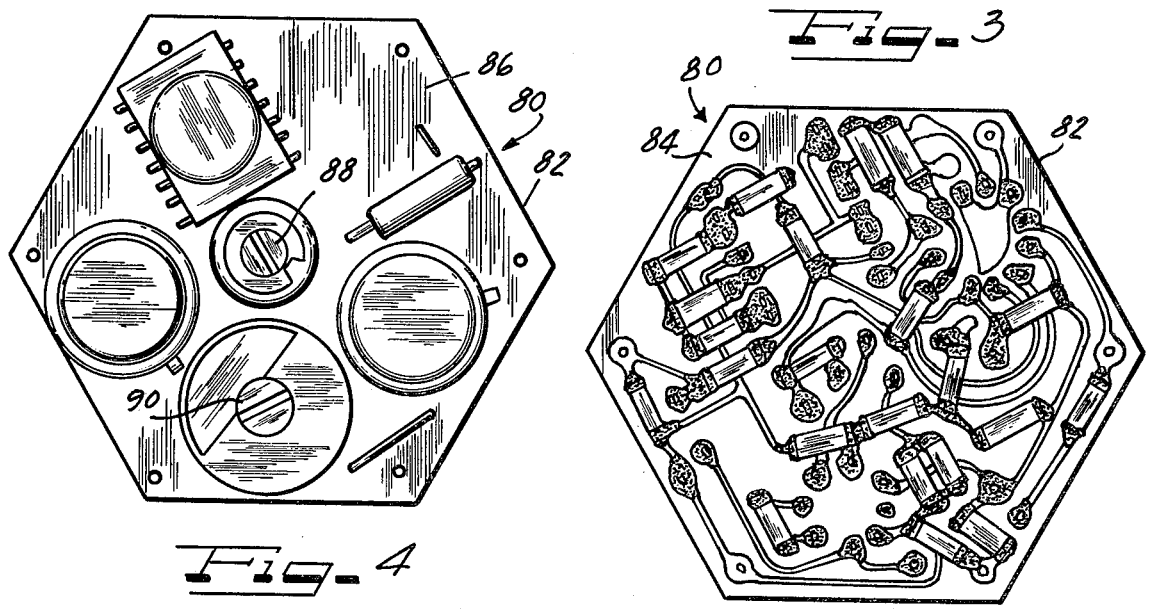
FIG. 3 is a plan view of one side of a circuitboard carrying a portion of the electrical components of the electronic sensing means.
FIG. 4 is a plan view of the other side of the circuitboard in FIG. 3, shown carrying other electrical components of the electronic sensing circuit.

Referring again to FIG. 1, below the capsule cavity closure is an electronic sensing circuit 80 which is electrically connected, via the leads 54, 54', to the pressure capsule 46. As best seen in FIGS. 3 and 4, the electronic sensing circuit comprises a circuitboard 82 having an upper surface 84 carrying a plurality of electrical components which are received in the recess 78 (FIG. 1) and a lower surface 86 which carries a plurality of electrical components, including adjustable components as indicated at 88 and 90.

As seen in FIG. 1, the circuitboard 82 of the electronic sensing circuit 80 rests on the upper edge of a base 92 which includes a recess 94 of a first diameter and an axially aligned recess 96 of a smaller diameter which receive therein the electrical components of the electronic sensing circuit which are located on the lower surface 86 of the circuitboard 82. The recess 96 has a shoulder 98 which provides support for a temperature controller 100. As best seen in FIGS. 5 and 6, the temperature controller 100 includes a circuitboard 101 having an upper surface 102 which carries electrical components of the temperature controller and a lower surface 103 which carries electrical components of the temperature controller. The circuitboard 101 includes a pair of apertures 104 and 105 for adjustment access to the elements 88 and 90 of the electronic sensing circuit 80.

The base 92 has an annular groove 106 with a heating element 108 mounted therein. The heating elements 44 and 108 are electrically connected to the temperature controller to maintain the temperature within the metal can at a predetermined temperature, such as 50° C. so that measurements made at lower ambients are independent of temperature.

The base 92 has a peripheral groove 110 with an O-ring 112 therein in a sealing relation with the inner surface 14 of the metal can, as an environmental seal. With the end wall 113, the base therefore provides a closure for the compartment 115 containing the electronic circuit devices 80 and 100.

The end wall 113 of the base 92 carries a plurality of electrical terminals 116 for supplying electrical power to the sensor and for providing an output signal, and has a peripheral flange forming a shoulder 114 which bears against the open end of the can.

As best seen in FIG. 7, the base 92 also includes a pair of apertures 144 and 146 which are aligned with the apertures 105 and 104 for access to the adjustments at 88 and 90. A sealing membrane, in the form of an adhesive label 145 is provided to cover and seal the apertures 144 and 146 after final adjustment of the pressure sensor.

FIG. 8 illustrates another embodiment of the invention which is similar to that illustrated in FIG. 1 with respect to the metal can and the components housed therein. The pressure sensor of FIG. 8, however, includes an external plastic jacket 118 having a cylindrical wall with an outer surface 120 and an inner surface 122 and an end wall having an outer surface 124 and an inner surface 126. The inner surface 122 is provided with a recess 128 and the inner surface 126 is provided with a recess 130. The jacket 118 provides both electrical and thermal insulation, and minimizes heat transfer with the external environment, while the recesses 128 and 130, together with the external surfaces of the metal can, provide dead air spaces and thus provide additional thermal resistance to reduce heat losses.

The insulating jacket 118 is provided with an integral stem 130 having a central fluid passageway 132 as a fluid input port in communication with the aperture 24 in the metal can. Again, the stem is adapted at 134 for connection to a fluid conduit, such as rubber tubing, and may include a thread 136 for use in securing the pressure sensor to a support. The jacket 118 may mount directly against the support or be provided with a shoulder 138 to stand-off the pressure sensor from the surface of the support. With the stem construction described, there is no metallic path for the enclosing can 80 to the panel on which the device is supported, and heat transfer is thus minimized.

The insulating jacket 118 includes an annular groove 139 for receiving the shoulder 114 on the peripheral edge of the base 92.

Fastening means, such as a number of screws 140, may be employed in securing the jacket, can and base; screws may similarly be used to secure the base within the can in the structure illustrated in FIG. 1.

The pressure sensor may be utilized to sense the differential between two pressures, in which case the pressure capsule is provided with a passageway 68' which extends to an aperture 24' in the sidewall of the can and by way of a stem 130' having a passageway 132' provides access to the space inside the diaphragms from a second fluid conduit which may be attached to the stem 130'. It is, of course necessary to provide a pressure seal at the interface between the pressure capsule and the metal can. This has not been illustrated but can be accomplished by way of sealing rings or an adhesive type of an elastomeric compound, such as silicone rubber or the like.

A heating control means is provided by temperature controller 100. The schematic diagram of FIG. 9 shows a pair of input terminals $116_6$ and $116_4$ for connection to an electrical supply. A voltage divider is formed by a plurality of resistors 146, 148 and 150 connected in series across the input terminals $116_6$ and $116_4$. The junction of the resistors 148 and 150 is connected by way of a resistor 152 and a resistor 154 to the base of a transistor 156 which has its emitter connected to the input terminal $116_6$ and its collector connected to the input terminal $116_4$ by way of a pair of parallel connected resistors constituted by the heating elements 42 and 108. A transistor 160 has a load resistor 162 connected between its collector and the input terminal $116_6$; its emitter is connected to the input terminal $116_4$. Therefore, the transistor 160 is connected as a voltage amplifier to provide driving current to transistor 156. A temperature-responsive control circuit of conventional type is represented by the block 164. The base or transistor 160 is connected to the collector of a transistor in the thermostatic control 164. Resistor 158 is the collector load for the latter transistor. Control 164 maintains the transistor 160 conductive and the transistor 156 likewise conductive, i.e., passing current through the heating elements 42 and 108, until the temperature at the control 164 reaches the value for which the control is set. At that point, the control removes a high potential at the terminal 164, and stops conduction of the transistors 160 and 156, thus cutting off the current through heating elements 42 and 108. Then, as the interior of the housing cools, the control 164 reapplies a high potential to turn on transistors 160 and 156, and the heating elements 42 and 108.

The control 164 may, for example be a standard LM 3911 circuit and the subscripts of the reference characters correspond to the terminals of that circuit. The transistor 160 may be a 2 N 2222, and the transistor 156 may be a 2 N 2907, as shown in the schedule of components.

Referring now to FIG. 10, a circuit diagram of a suitable electronic sensing circuit is illustrated as comprising fundamentally an oscillator 168, a bridge 180–194 and an amplifier 204. The capacitance of the pressure responsive capsule 46 is indicated at 192. Changes in the value of the capacitance 192 alter the balance of the bridge, which provides a + or − output. The bridge output signal is amplified by the amplifier 204. This type of circuit is well known in the art and will not be dealt with in detail herein. The oscillator 168 may be provided by an RCA CD4001 AK circuit, the diodes 184–190 by an RCA CA3039 circuit and the amplifier may be provided by an RCA CA3130 T circuit, the oscillator circuit and the amplifier circuit carrying terminal subscript designations which correspond to the actual terminal designations of these circuits.

One versed in the art will understand and appreciate the operation of the circuits of FIGS. 9 and 10 without further discussion; however, the following schedule of components will be helpful.

SCHEDULE OF COMPONENTS

| Reference No. | Identification or Value |
| --- | --- |
| 44, 108 | 80 ohm |
| 146 | 2.7 K ohm |
| 148 | 51 K ohm |
| 150 | 47 K ohm |
| 152 | 20 M ohm |
| 154, 166 | 910 ohm |
| 156 | 2N2907 |
| 158 | 20 K ohm |
| 160 | 2N2222 |
| 162, 174, 196, 200, 218 | 10 K ohm |
| 164 | LM 3911 |
| 168 | CD 4001 AK |
| 170 | 15 pf |
| 172 | 50 K ohm |
| 176 | 68 pf |
| 178, 208 | 2200 pf |
| 180, 182, 198, 202 | 2700 pf |
| 184, 186, 188, 190 | CA3039 |
| $194_1$, $194_2$ | 6.8 pf |
| $194_3$ | 3-8 pf |
| 204 | CA 3130 T |
| 206 | 68 pf |
| 210 | 68 K ohm |
| 212 | 1 K ohm pot. |
| 214 | 3.3 K ohm |
| 216 | 6 K ohm |
| 220, 224, 226 | IN916 |
| 222 | IN825 |
| 230 | 150 ohm |
| 232 | 0.1 $\mu f$ |

Figure 11:
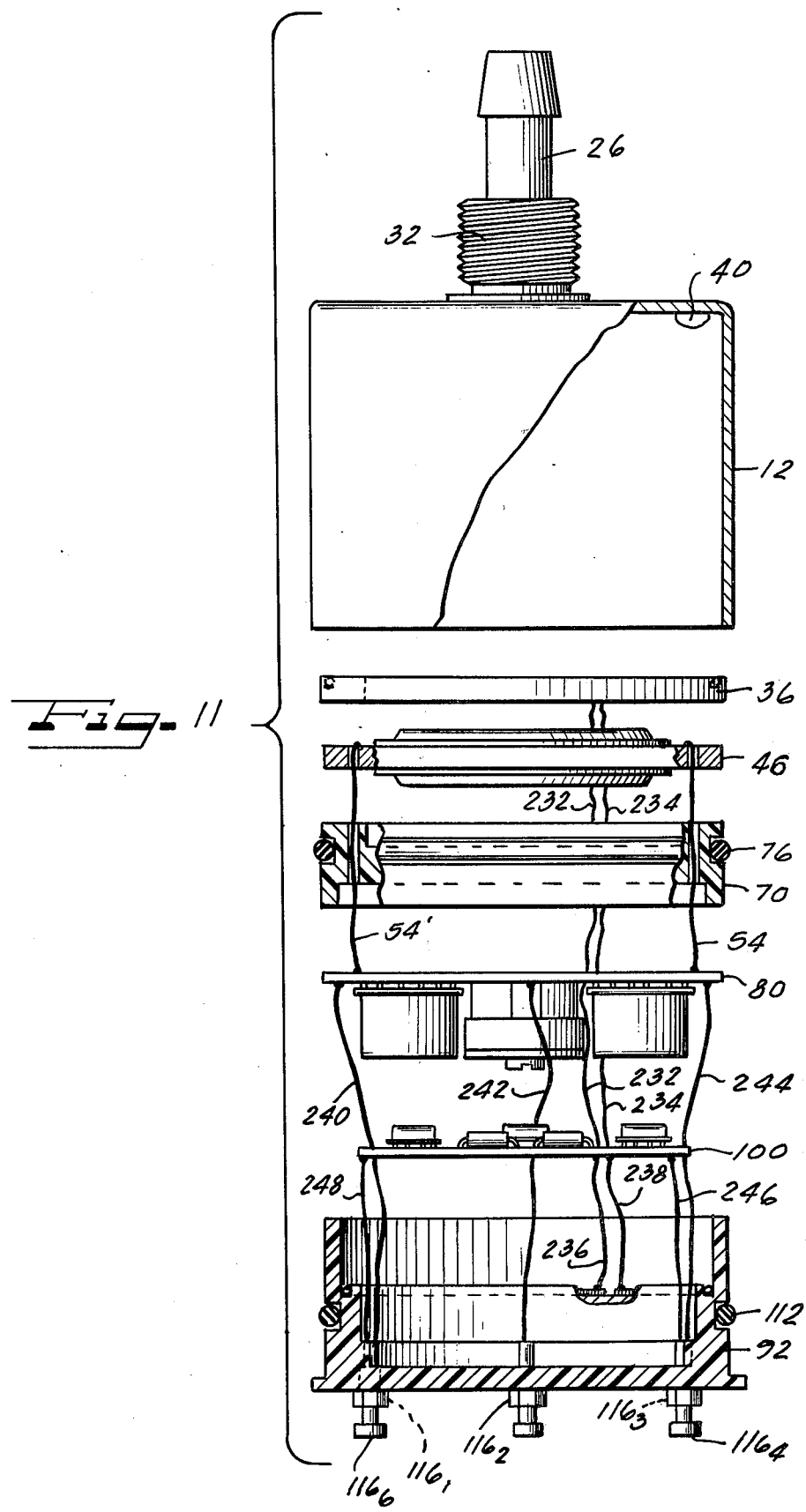
FIG. 11 is an exploded view showing the assembly procedure for a pressure sensor constructed in accordance with the present invention.

The major structural components mounted within the can are provided with an irregular outline (as shown for circuitboard 82 in FIGS. 3 and 4) or holes for receiving conductors therethrough (as shown in FIG. 11 for capsule 46 and closure 70). These conductors establish electrical connections between the two heating elements and the temperature controller, between the pressure capsule and the electronic sensing circuit, and provide power input to the electrical circuits and an output for an electrical signal at the terminals $116_2$–$116_3$. The electrical connections therefore extend from the innermost component to the outermost component and, when connected, provide an electrical subassembly which may be tested prior to placement thereof into the can. After this first electrical test, and after the subassembly has been placed in the can, a second electrical test can be made in which the adjustable elements 88 and 90 are operated via the apertures 104, 105, 144 and 146 to effect final "trimming" of the circuits. The pressure sensor is then sealed by applying the adhesive element 145 over the apertures 144 and 146. The adhesive element may be in the form of a label which identifies origin of manufacture and which identifies the terminals $116_1$–$116_6$.

In assembling the pressure sensor, according to the present invention, the following method has proven advantageous, although the order of placement and connections of the leads should not be taken to the limiting, but exemplary. Referring to FIG. 11, the electrical conductors 232 and 234 are connected between the upper heater and the circuitboard of the temperature controller 100. The leads 54 and 54' of the pressure capsule 42 are electrically connected to appropriate points on the circuitboard of the electronic sensing circuit 80. The electrical connections 236 and 238 are then established between the lower heating element and the same electrical locations as the conductors 232 and 234 on the temperature controller 100 such that the heating elements are connected in parallel as illustrated in FIG. 9. The terminal $116_1$ (shown behind the terminal $116_6$) is connected by way of an electrical conductor 240 to supply a positive potential to the electronic sensing circuit, while the terminal $116_2$ has the electrical conductor 242 connected thereto and to provide a reference potential, here ground, to the electronic sensing circuit. The electrical conductor 244 is extended between the output terminal of the electronic sensing circuit and the terminal $116_3$, illustrated behind the terminal $116_4$. The conductors 246 and 248 are then connected between the respective terminals $116_4$ and $116_6$ and the appropriate positive and negative input terminals of the circuitboard of the temperature controller 100. Although shown in an exaggerated exploded view, the subassembly extending from the spacer ring 36 to the base 92 is drawn together to form a complete electrical subassembly capable of being handled and tested. If desired, the subassembly may then be tested and adjusted prior to placement within the can.

Before placing the subassembly within the can, it is, of course, necessary to effect a fluid-tight seal of any passages which may exist between the upper and lower sides of the annular closure element 70. This may be done by the use of any suitable sealant compound.

A plurality, usually three, dabs of elastomeric material 40 such as RTV silicone are placed on the inner surface of the end wall of the can and, with the O-rings 76 and 112 in place, the subassembly is inserted into the can substantially to the point where the lower edge of the can engages the O-ring 76. A modest vacuum is then applied to the input port constituted by the stem 26 and the fluid passageway 28, or by the stem 130 and the fluid passageway 132, whereby a vacuum assist is provided to aid in inserting the subassembly into the can. Finally, the base 92 is adjusted to align the screw holes and the screws 140 are inserted and tightened to secure the housing.

Although I have described my invention by reference to certain exemplary embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A pressure transducer comprising:
   a hollow metal can including a closed end and an open end and a closed end, an aperture in said closed end for receiving fluid pressure;
   a first insulator closing said open end of said hollow metal can, said first insulator including a shoulder, and a first groove therein;
   a first heater in said first groove;
   a second insulator adjacent said closed end of said metal can, said second insulator including a second groove therein;
   a second heater in said second groove;
   a third insulator within said metal can between said first and second insulators sealing the interior of said can to provide first and second chambers;
   a pressure transducer mounted on said third insulator in said first chamber in communication with said aperture, said transducer responsive to pressure to provide a corresponding electrical value;

an electronic sensing circuit mounted on said third insulator within said second chamber and electrically connected to said pressure transducer to provide an electrical signal corresponding to said electrical value; and a heater circuit mounted on said shoulder of said first insulator, said heater circuit connected to said first and second heaters and operable to maintain the temperature within said housing at a predetermined level.

2. The pressure sensor according to claim 1, and further comprising:
an input tube connected in fluid communication with said aperture in said closed end of said metal can.

3. The pressure sensor according to claim 1, comprising: an insulating can embracing said metal can.

4. The pressure sensor according to claim 1, comprising:
a metal tube connected in fluid communication with said aperture,
said tube including a threaded portion of the exterior thereof for fastening to a support.

5. The pressure sensor of claim 1, comprising:
an insulating second can embracing said metal can, said second can including an aperture aligned with said aperture in said metal can; and
an insulating tube connected to said insulating second can and serving as a pressure input.

6. The pressure sensor according to claim 1, wherein said third insulator includes a peripheral third groove therein and an O-ring in said third groove in sealing relation to the inner surface of said hollow can.

7. The pressure sensor according to claim 1, wherein said first insulator includes a peripheral third groove and an O-ring in said third groove in sealing relation to the inner surface of said hollow can.

8. The pressure sensor according to claim 1, and further comprising:
an input tube connected in fluid communication with said aperture in said closed end of said metal can; and
a second input tube connected in fluid communication with said pressure transducer, said pressure transducer including a pair of diaphragms with fluid-connected chambers therebetween, said second input tube connected in fluid communication with said fluid-connected chambers, whereby said pressure transducer is responsive to the pressure differential between pressures applied to said first and second input tubes.

9. A pressure sensor comprising:
a cylindrical hollow can including an open end and a closed end having an aperture therein for receiving fluid pressure;
an annular first insulator mounted in said open end of said can and including a peripheral first groove, an annular second groove, and an annular shoulder;
a first O-ring in said first groove in sealed relation to the inner surface of said can;
a first heater element in said annular second groove;
a ring-shaped second insulator including an annular third groove;
a second heater element in said annular third groove;
a plurality of insulating beads spacing said ring-shaped second insulator from said closed end of said can;
heating means including a first circuit board mounted on said annular shoulder of said first insulator, and thermostatic control means carried on said first circuit board and electrically connected to and controlling energization of said first and second heater elements;
an annular third insulator mounted between said first and second insulators and including a peripheral second groove;
a second O-ring in said second peripheral groove in sealed relation to the inner surface of said can dividing said can into first and second chambers;
a pressure transducer mounted on said third insulator in said first chamber in communication with said aperture and including an electrical element having a pressure-dependent electrical value; and
an electronic circuit electrically connected to said electrical element and operable to provide an output signal in accordance with the pressure-effected electrical value, said electronic circuit mounted on said third insulator in said second chamber.

10. The pressure sensor of claim 9, further comprising: a fluid tube connected in fluid communication with said aperture, said fluid tube adapted for connection to a fluid supply.

11. The pressure sensor of claim 10, further comprising: a jacket of insulating material covering said hollow metal can.

12. The pressure sensor of claim 11, wherein said jacket comprises inner wall portions spaced from said can to provide insulating pockets therebetween.

13. The pressure sensor of claim 11, wherein said fluid tube comprises a threaded portion for connection to a support.

14. The pressure sensor of claim 13, wherein said fluid tube is metal.

15. The pressure sensor of claim 13, wherein said fluid tube is a heat insulating material.

16. A pressure sensor comprising:
transducer means including an electrical element and responsive to fluid pressure to provide a corresponding electrical value;
an electronic circuit including an input and an output, said input connected to said electrical element and said electronic circuit responsive to said electrical value to provide a corresponding electrical signal at said output;
a housing enclosing said transducer means and said electronic circuit, said housing including an input port for connection to a fluid pressure supply;
isolation means in said housing between said transducer means and said electronic circuit and in sealed relation to the inner walls of said housing forming a pressure chamber for said transducer; and
heating means in said housing on each side of said isolation means for maintaining predetermined temperatures for said transducer and said electronic circuit.

17. A pressure sensor according to claim 16, wherein said housing comprises a good heat conducting material for equalizing the temperature within said housing for said transducer means and said electronic circuit.

18. A pressure sensor according to claim 17, wherein said housing comprises copper.

19. A pressure sensor according to claim 16, wherein said housing comprises a metal can and an insulating material about said can, said can and said insulating material each including an opening aligned with the like opening in the other and constituting said input port.

20. A pressure sensor for connection between a supply of fluid pressure which contains a fluid having a deleterious effect on electronic circuits and an electrical circuit, said sensor comprising:
- electronic sensing means including a pressure-to-electrical transducer, and an electronic sensor electrically connected to said transducer and operable to produce electrical signals corresponding to pressures applied to said transducer;
- a housing enclosing said electronic sensing means, said housing including a fluid input for connection to the fluid supply;
- a fluid barrier within said housing between said transducer and said electronic sensor for sealing said electronic sensor from the deleterious effects of the pressurized fluid and providing a pressure chamber in said housing for said transducer and a chamber for said electronic sensor; and
- heating means in each of said chambers and temperature control means in the electronic sensor chamber for maintaining each of the chambers at a predetermined temperature.

21. The pressure sensor of claim 20, wherein said housing comprises:
- a heat conducting material in the shape of a hollow can having a closed end and an open end, said closed end including said input port.

22. The pressure sensor of claim 20, wherein said housing comprises:
- a metal can including an open end and a closed end including an aperture therein; and
- an insulating can embracing said metal can and including an open end and a closed end having an aperture therein aligned with the aperture in said metal can; and
- an insulating tube connected to said insulating can in fluid communication with said aligned apertures forming said input port.

23. A pressure sensor comprising:
- a housing including a metal can comprising an open end and a closed end, said closed end including a first aperture therein for receiving a fluid pressure;
- a fluid barrier within said fluid sealed to said metal can and spaced from said first aperture and forming a pressure chamber;
- a pressure transducer mounted on one side of said fluid barrier in said pressure chamber and responsive to the fluid pressure to provide a signal corresponding to pressure;
- an electronic circuit mounted within said metal can on the other side of said fluid barrier and electrically connected to said pressure transducer, said electrical circuit responsive to said signals of said transducer to provide corresponding electrical signals;
- first heating means mounted in said metal can on one side of said barrier; and
- second heating means mounted in said metal can on the other side of said barrier,
- said first and second heating means operable to maintain predetermined local evnironmental temperatures for said pressure transducer and said electronic circuit.

24. The pressure sensor of claim 23, wherein said metal can comprises a material having good heat conductivity to maintain a constant temperature on both sides of said fluid barrier.

25. The pressure sensor of claim 23, wherein said metal can comprises copper.

26. The pressure sensor of claim 23, wherein said housing comprises:
- an insulating can embracing said metal can, said insulating can including an open end and a closed end having a second aperture aligned with said first aperture; and
- said metal can includes a good heat conductive material.

27. A pressure sensor comprising:
- sensing means including a pressure-to-electrical transducer and an electronic sensor electrically connected to said transducer and operable to produce an electrical signal corresponding to pressure applied to said transducer;
- a housing enclosing said sensing means, said housing including a fluid input for connection to fluid under pressure;
- a fluid barrier within said housing sealing the interior of said housing between said transducer and said electronic sensor, said fluid barrier including an annular element having a circumferential groove therein and an O-ring in said groove sealing against the inner wall of said housing; and
- heating means within said housing heating and maintaining the interior thereof at a predetermined temperature, said heating means comprising a first heater mounted in said housing on one side of said barrier, and a second heater mounted in said housing on the other side of said barrier.

28. The pressure sensor of claim 27, wherein said transducer is mounted on said fluid barrier.

29. The pressure sensor of claim 27, comprising: an end plate sealing the open end of said housing.

30. The pressure sensor of claim 27, wherein each of said heaters comprises a coiled resistance wire.

31. A pressure transducer comprising:
- a hollow metal can including a closed end, and an aperture in said closed end for receiving fluid pressure;
- a first insulator closing said open end of said hollow metal can;
- a first heater mounted on said first insulator;
- a second insulator adjacent said closed end of said metal can;
- a second heater mounted on said second insulator;
- a third insulator within said metal can between said first and second insulators sealing the interior of said can to provide first and second chambers;
- a pressure transducer mounted on said third insulator in said first chamber in communication with said aperture, said transducer responsive to pressure to provide a corresponding electrical value;
- an electronic sensing circuit mounted on said third insulator within said second chamber and electrically connected to said pressure transducer to provide an electrical signal corresponding to said electrical value; and
- a heater circuit mounted on said first insulator, said heater circuit electrically connected to said first and second heaters and operable to maintain the temperature within said housing at a predetermined level.

32. A pressure transducer comprising:
- a hollow metal can including a closed end, an open end, a sidewall, first aperture in said closed end for receiving a first fluid pressure, and a second aperture in said sidewall for receiving a second fluid pressure;

a first insulator closing said open end of said hollow metal can, said first insulator including a shoulder, and a first groove therein;

a first heater in said first groove;

a second insulator adjacent said closed end of said metal can, said second insulator including a second groove therein;

a second heater in said second groove;

a third insulator within said metal can between said first and second insulators sealing the interior of said can to provide first and second chambers;

a pressure transducer mounted on said third insulator in said first chamber in fluid communication with said first aperture and in fluid communication with said second aperture, said transducer responsive to the pressure differential applied at said first and second apertures to provide a corresponding electrical value;

an electronic sensing circuit mounted on said third insulator within said second chamber and electrically connected to said pressure transducer to provide an electrical signal corresponding to said electrical value; and a heater circuit mounted on said shoulder of said first insulator, said heater circuit connected to said first and second heaters and operable to maintain the temperature within said housing at a predetermined level.

33. A pressure transducer comprising:

a hollow can including an open end and a closed end, and an aperture in said closed end for receiving fluid pressure;

input means connected in fluid communication with said aperture in said closed end of said can;

a first member closing said open end of said hollow can;

a first sealing means about said first member in sealed relation to the inner surface of said can;

a second member adjacent said closed end of said can;

insulating means between said second member and said can;

a third member within said can between said first and second members a second sealing means about said third member in sealed relation to the inner surface of said can dividing said can into first and second chambers;

a pressure transducer mounted between said second and third members in said first chamber in communication with said aperture, said transducer responsive to pressure to provide a corresponding electrical value; and an electronic sensing circuit mounted within said second chamber and electrically connected to said pressure transducer to provide an electrical signal corresponding to said electrical value.

34. The pressure sensor according to claim 33, wherein: said can is metal and including an insulating can embracing said metal can.

35. The pressure sensor according to claim 33 wherein: said input means includes a tube having a threaded portion on the exterior thereof for fastening to a support.

36. The pressure sensor according to claim 33 comprising: an insulating second can embracing said hollow can, said second can including an aperture aligned with said aperture in said hollow can; and wherein said input means is an insulating tube connected to said insulating second can.

37. The pressure sensor according to claim 33, wherein: said third member includes a peripheral groove therein and a sealing ring in said groove in sealing relation to the inner surface of said hollow can.

38. The pressure sensor according to claim 33, wherein: said first member includes a peripheral groove and a sealing ring in said peripheral groove in sealing relation to the inner surface of said hollow can.

39. The pressure sensor according to claim 33, wherein: said first member is an insulator.

40. The pressure sensor according to claim 33, wherein: said second member is an insulator.

41. The pressure sensor according to claim 33, wherein: said third member is an insulator.

42. The pressure sensor according to claim 33, wherein: said first, second and third members are insulators.

43. The pressure sensor according to claim 33, wherein: said pressure transducer is mounted on said third member.

44. The pressure sensor according to claim 33, wherein: said electronic sensing circuit is mounted on said third member.

45. The pressure sensor according to claim 33, wherein: said first member includes first and second shoulders, and including an electrically operated element mounted on said first shoulder, and a control circuit mounted on said second shoulder.

46. The pressure sensor according to claim 45, wherein: said second member includes a third shoulder, and including a second electrically operated element mounted on said third shoulder.

47. A pressure sensor comprising:

a hollow can including an open end and a closed end having an aperture therein for receiving fluid pressure;

a first member mounted in and closing said open end of said can and including a peripheral first groove;

a first sealing ring in said first groove in sealed relation to the inner surface of said can;

a second member adjacent said closed end of said can;

a plurality of insulating beads spacing said second member from said closed end of said can;

a third member mounted between said first and second members and including a peripheral second groove;

a second sealing ring in said second peripheral groove in sealed relation to the inner surface of said can dividing said can into first and second chambers;

a pressure transducer mounted in said first chamber in communication with said aperture and including an electrical element having a pressure-dependent electrical value; and an electronic circuit electrically connected to said electrical element and operable to provide an output signal in accordance with the pressure-effected electrical value, said electronic circuit being mounted in said second chamber.

48. The pressure sensor of claim 47, further comprising: a fluid tube connected in fluid communication with said aperture, said fluid tube adapted for connection to a fluid supply.

49. The pressure sensor of claim 48 wherein said fluid tube includes a threaded portion for connection to a support.

50. The pressure sensor of claim 48, wherein said fluid tube in metal.

51. The pressure sensor of claim 48, wherein said fluid tube is fabricated of a heat insulating material.

52. The pressure sensor of claim 47, further comprising: a jacket of insulating material covering said hollow can.

53. The pressure sensor of claim 52, wherein said jacket comprises inner wall portions spaced from said can to provide insulating space therebetween.

54. A pressure transducer comprising:
a hollow can including an open end and a closed end, an aperture in said closed end for receiving fluid pressure;
a pressure input means connected in fluid communication with said aperture in said closed end of said can;
a first member closing said open end of said hollow can, said first member including first and second shoulders;
a first electrically operated element mounted on said first shoulder;
a second member adjacent said closed end of said can, said second member including a third shoulder;
a second electrically operated element mounted on said third shoulder;
a third member within said can between said first and second members sealing the interior of said can to provide first and second chambers;
a pressure transducer mounted in said first chamber in communication with said aperture, said transducer responsive to pressure to provide a corresponding electrical value;
an electronic sensing circuit mounted within said second chamber and electrically connected to said pressure transducer to provide an electrical signal corresponding to said electrical value; and
a control circuit mounted on said second shoulder of said first member, said control circuit connected to said first and second electrically operable elements and operable to maintain a predetermined environmental condition within said can.

55. A differential pressure transducer comprising:
a housing including a sidewall, an open end, a closed end, a first pressure port in said closed end for receiving a first fluid pressure, and a second pressure port in said sidewall for receiving a second fluid pressure;
a first member closing said open end of said housing;
a first sealing means about said first member in sealed relation to the inner surface of said can;
a second member adjacent said closed end of said housing;
insulating means between said second member and said can;
a third member within said housing between said first and second members;
a second sealing means about said third member in sealed relation to the inner surface of said can dividing said can into first and second chambers;
a pressure transducer mounted between said second and third members in said first chamber with its exterior in fluid communication with said first pressure port, said transducer including an internal chamber and a fluid passageway connecting said internal chamber in fluid communication with said second pressure port, said transducer responsive to the difference in pressures applied to said first and second pressure ports to provide a corresponding electrical value; and
an electronic sensing circuit mounted within said second chamber and electrically connected to said pressure transducer to provide an electrical signal corresponding to said electrical value and representing the pressure difference.

* * * * *